(12) United States Patent
Boyd

(10) Patent No.: US 10,720,817 B1
(45) Date of Patent: Jul. 21, 2020

(54) DC INDUCTION MOTOR DRIVEN BY A UNIDIRECTIONAL CURRENT INDUCED IN TO A ROTOR RING

(71) Applicant: COLERIDGE DESIGN ASSOCIATES LLC, San Jose, CA (US)

(72) Inventor: Geoffrey A. Boyd, San Jose, CA (US)

(73) Assignee: COLERIDGE DESIGN ASSOCIATES LLC, San Jose, CA (US)

( * ) Notice: Subject to any disclaimer, the term of this patent is extended or adjusted under 35 U.S.C. 154(b) by 0 days.

(21) Appl. No.: 16/154,687

(22) Filed: Oct. 8, 2018

Related U.S. Application Data

(63) Continuation of application No. 14/468,315, filed on Aug. 25, 2014, now Pat. No. 10,097,070, which is a continuation-in-part of application No. 13/849,494, filed on Mar. 23, 2013, now Pat. No. 8,958,597.

(60) Provisional application No. 61/614,997, filed on Mar. 23, 2012.

(51) Int. Cl.
*H02K 17/02* (2006.01)
*H02K 17/16* (2006.01)
*H02K 41/035* (2006.01)
*H02K 3/47* (2006.01)

(52) U.S. Cl.
CPC .............. *H02K 17/02* (2013.01); *H02K 3/47* (2013.01); *H02K 17/165* (2013.01); *H02K 41/0358* (2013.01)

(58) Field of Classification Search
CPC ........ H02K 17/02; H02K 17/04; H02K 17/16; H02K 17/165; H02K 17/18; H02K 17/185; H02K 17/20; H02K 17/205; H02K 17/30; H02K 15/0012; H02K 41/0354; H02K 1/246; H02K 1/265; H02K 1/24
USPC ............ 310/166, 158, 156.78, 125, 216.107, 310/216.114, 261.1, 49, 49.41–49.48, 310/49.39, 104, 349, 264, 266, 265
See application file for complete search history.

(56) References Cited

U.S. PATENT DOCUMENTS

| | | | | |
|---|---|---|---|---|
| 2,885,645 | A * | 5/1959 | Wennerberg | H01F 27/28 336/120 |
| 3,453,510 | A * | 7/1969 | Kreuter | H02K 37/22 318/674 |
| 3,875,511 | A * | 4/1975 | Sims | G01N 27/82 324/545 |
| 4,394,597 | A * | 7/1983 | Mas | H01F 1/153 310/268 |
| 4,458,167 | A * | 7/1984 | Leveille | H02K 25/00 310/166 |
| 4,827,172 | A * | 5/1989 | Kobayashi | F02N 11/00 174/DIG. 21 |

(Continued)

*Primary Examiner* — Maged M Almawri
(74) *Attorney, Agent, or Firm* — Minisandram Law Firm; Raghunath S. Minisandram

(57) ABSTRACT

A motor is disclosed. The motor includes a stator with a stator coil to generate a periodic unidirectional field current flowing through the stator coil and a rotor. An air gap is disposed between the stator and the rotor. The rotor has at least one rotor ring, a portion of the rotor ring is disposed in the air gap. Due to the unidirectional magnetic field, a periodic electric current is induced in the rotor ring. The electric current flowing through the portion of the rotor ring disposed in the air gap flows in a first direction to rotate the rotor relative to the stator.

9 Claims, 15 Drawing Sheets

(56) References Cited

U.S. PATENT DOCUMENTS

| | | | | |
|---|---|---|---|---|
| 5,124,606 A * | 6/1992 | Eisenbeis | H02K 17/30 | 112/277 |
| 5,317,228 A * | 5/1994 | Leupold | H02K 31/02 | 310/154.21 |
| 5,495,132 A * | 2/1996 | Shultz | B60S 1/08 | 310/211 |
| 5,545,936 A * | 8/1996 | Davenport | H02K 19/103 | 310/112 |
| 5,545,938 A * | 8/1996 | Mecrow | H02K 3/18 | 310/156.64 |
| 5,550,413 A * | 8/1996 | Bernus | F16C 32/0444 | 310/36 |
| 6,118,202 A * | 9/2000 | Pinkerton | H02K 3/47 | 310/103 |
| 6,166,473 A * | 12/2000 | Hayasaka | H02K 21/24 | 310/114 |
| 6,787,958 B1 * | 9/2004 | Walter | H02K 1/246 | 310/162 |
| 7,081,698 B1 * | 7/2006 | Burkholder | H02K 3/26 | 310/261.1 |
| 8,847,522 B2 * | 9/2014 | Nashiki | H02K 1/12 | 318/254.1 |
| 2002/0030415 A1 * | 3/2002 | Morooka | H02K 5/08 | 310/68 R |
| 2002/0070622 A1 * | 6/2002 | Rico | H02K 1/26 | 310/51 |
| 2004/0113511 A1 * | 6/2004 | Schmidt | H02K 1/148 | 310/216.061 |
| 2006/0125345 A1 * | 6/2006 | Lee | H02K 1/26 | 310/269 |
| 2008/0042511 A1 * | 2/2008 | Evans | H02K 1/148 | 310/216.067 |
| 2010/0123426 A1 * | 5/2010 | Nashiki | H02K 1/12 | 318/701 |
| 2015/0130390 A1 * | 5/2015 | Pietromonaco | H02K 16/02 | 318/716 |
| 2015/0145466 A1 * | 5/2015 | Ha | H02P 1/42 | 318/729 |
| 2017/0076847 A1 * | 3/2017 | Gieras | F03G 3/06 | |

* cited by examiner

US 10,720,817 B1

DC INDUCTION MOTOR DRIVEN BY A UNIDIRECTIONAL CURRENT INDUCED IN TO A ROTOR RING

RELATED APPLICATIONS

This application is a continuation application of and claims priority to U.S. patent application Ser. No. 14/468, 315 and entitled "DC Induction Motor With Stator Coil Driven By A Unidirectional Field Current, which is a continuation-in-part application of and claims priority to U.S. patent application Ser. No. 13/849,494 filed on Mar. 23, 2013, since patented as U.S. Pat. No. 8,958,597 and entitled "Speaker With Voice Coil And Field Coil", which application claims priority from the U.S. provisional application with Ser. No. 61/614,997, which was filed on Mar. 23, 2012. The disclosure of U.S. patent application Ser. Nos. 14/468, 315, 13/849,494 and provisional application No. 61/614,997 are incorporated herein by reference in their entirety, as if set out in full.

BACKGROUND OF THE DISCLOSURE

Technical Field of the Disclosure

The present invention is related in general to electromagnetic motors, and in particular to an electromagnetic motor which does not utilize permanent magnets.

Description of the Related Art

Generally, motors include permanent magnets. Permanent magnets like Neodymium have more replaced the earlier used bulky and power consuming electromagnets. Due to this and other reasons, rare earth raw materials like Neodymium have increased significantly. This has driven the cost of NdFeB magnets to go up, thereby increasing the cost of motors using permanent magnets. Eliminating or minimizing the use of costly components in building motors is desirable.

With one or more of these needs in mind, the current disclosure arises. This brief summary has been provided so that the nature of the disclosure may be understood quickly. A more complete understanding of the disclosure can be obtained by reference to the following detailed description of the various embodiments thereof in connection with the attached drawings.

SUMMARY OF THE DISCLOSURE

In one example, a motor is disclosed. The motor includes a rotor and a stator with a stator coil to generate a periodic unidirectional magnetic field based upon a unidirectional field current flowing through the stator coil. An air gap is disposed between the stator and the rotor. The rotor has at least one rotor ring, a portion of the rotor ring is disposed in the air gap. A periodic electric current is induced through the rotor ring due to the unidirectional magnetic field generated based upon the unidirectional field current flowing through the stator coil. The electric current flowing through the portion of the rotor ring disposed in the air gap flows in a first direction to rotate the rotor relative to the stator of the motor.

This brief summary is provided so that the nature of the disclosure may be understood quickly. A more complete understanding of the disclosure can be obtained by reference to the following detailed description of the preferred embodiments thereof in connection with the attached drawings.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1A:
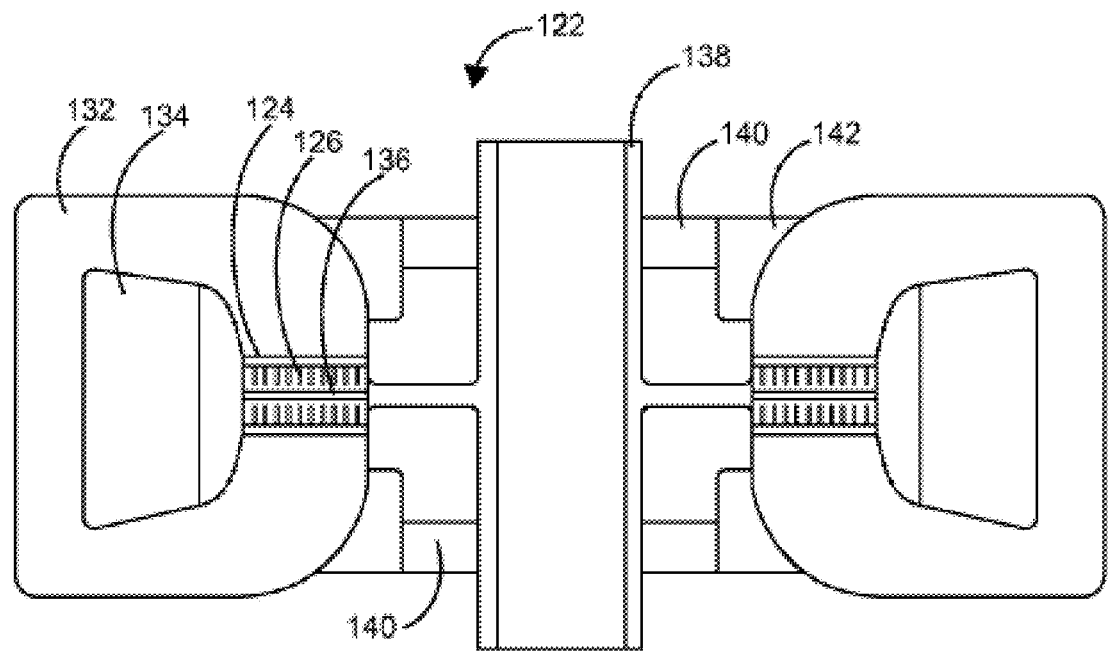
FIG. 1A is a cross-sectional view of an axisymmetric schematic depiction of a PCMS (Pot Core Magnet Structure) rotational motor.

FIG. 1A is a cross-sectional view of an axisymmetric schematic depiction of a PCMS (Pot Core Magnet Structure) rotational motor 122 according to an alternate embodiment of the present invention. The PCMS motor 122 comprises a pot core magnet structure 132 fabricated using a soft magnetic composite ArcoLam 2FHR. The pot core magnet structure 132 includes field coil turns 134 made with 99.9% aluminum wire and a rotor 124 comprising a 4 layer 14 AWG copper magnet wire radially wound in an air gap 136 with flux free coil return cages 126. A hollow rotor shaft 138 comprises high strength alloy. The upper and lower bearings 140 are preferably made with lightweight silicon nitride ceramic and are attached with a bearing support 142.

The design is a doubly fed PCMS rotational motor capable of producing 250 HP at 10,000 RPM. In a rotational motor design the Torque T (Nm) on the rotor should be evaluated. In the case of the doubly fed PCMS motor, this can be evaluated directly as follows.

The radial force on the rotor is the Lorentz force and is given by:

$$F = B_g \cdot I_{rc} \cdot L_{rc}$$

Wherein $B_g$ (T, Tesla) is the magnetic flux density in the air gap containing the radially wound rotor coil, $I_{rc}$ (A, Amps) is the peak current through the radial elements of the rotor coil in the air gap, $L_{rc}$ (m, meters) is the total length of wire in the air gap subjected to $B_g$.

The magneto motive force $F_m$ which drives the magnet flux ($\varphi$) through pot core magnet system's air gap according to Ampere's law is given by:

$$NI_{fc} = H_c \cdot L_e + H_g \cdot L_g$$

Wherein: N is the number of turns of the field coil encircling the core, $I_{fc}$ (A, Amps) is the field coil current encircling the core, $H_c$, $H_g$ (Am-1, Amps/meter) are the magnetic field strengths, and $L_e$, $L_g$ (m, meters) are the effective lengths of the magnetic circuit through the core and air gap respectively.

Using the identity $B = \mu_r \mu_0 H$ and assuming that the flux density through the core is constant (i.e. effective area is constant) then:

$$NI_{fc} = B_c \cdot L_e / (\mu_r \mu_0) + B_g \cdot L_g / \mu_0$$

But the relative permeability $\mu_r \gg 1$ for the ferromagnetic core so the first term is negligible in comparison to the second so:

$$NI_{fc} = B_g \cdot L_g / \mu_0$$

This gives the gap flux density $B_g$ which can be substituted in the Lorentz force equation to give:

$$F = \mu_0 \cdot N \cdot I_{fc} \cdot I_{rc} \cdot L_{rc} / L_g$$

This force acts radially on the rotor coil and manifests itself as a rotational torque T which is given by:

$$T = F \cdot \langle R \rangle$$

Where $\langle R \rangle$ is the average or summed radius over which the force acts and is given by:

$$\langle R \rangle = (R_{max} + R_{min}) / 2$$

Where $R_{max}$ and $R_{min}$ are the outer and inner radii of rotor coil. In this case 125 mm and 75 mm gives $\langle R \rangle = 100$ mm, so:

$$T' = \mu_0 \cdot N \cdot I_{fc} \cdot I_{rc} \cdot (L_{rc} / L_g) \cdot \langle R \rangle$$

Where for the purpose of calculations $\mu_0 = 4\pi \times 10^{-7}$ is a fundamental constant, the permeability of free space.

In order to achieve wiring of the rotor 124 in only one radial direction, the rotor coil windings are returned as in FIG. 1A through a flux free cage 126 which means that at least ½ of the winding is not subject to the Lorentz force induced torque. e.g. $L_{rc} \rightarrow L_r/2$. Accordingly the torque is modified as follows:

$$T = \mu_0 \cdot N \cdot I_{fc} \cdot I_{rc} \cdot (L_{rc} / 2L_g) \cdot \langle R \rangle$$

The design process for a PCMS motor is an iterative or parametric process using the above equation as a guide. This process employed below to estimate the motor parameters needed to achieve the design peak power goal of 250 HP at 10,000 RPM, the result of this process is shown in FIG. 1A.

In general, the maximum induction attainable in a pot core magnet structure using pure iron Fe cores is about 1.0 to 1.5 Tesla. The number of close packed layers of the magnet wire determines the air gap length Lg. Copper AWG 14 with a diameter of 1.68 mm was selected in this case, as well as a 4 layer rotor coil comprising 2 layers on each half of the rotor cages. The number of turns N on the field coil may be calculated as follows:

$$NI_{fc} = B_g \cdot L_g / \mu_0$$

If B=1.5 T, $L_g$=4 layers×1.7=6.8 mm, and $I_{fc}$=25 A peak current, then N=324 turns on the field coil to give $B_g$=1.5 T.

A 250 HP motor turning at 10,000 RPM requires a torque of 178.0 Nm. It is assumed that torque is not an explicit function of RPM. This is only a first approximation because as the RPM of the motor goes up, the back emf increases and sets an effective limit to the drive current.

The first estimate of the rotor diameters $R_{max}$ and $R_{min}$ emerges from the following relationships.

$$n_r = (2\pi R_{min} - 2dn_s) / d$$

$$L_{rc} = n_r (R_{max} - R_{min})$$

Where $L_{rc}$=rotor coil wire length in air gap, $n_r$=number of radial traverses of the rotor coil across all the rotor segments, $R_{min}$=inner radius of the rotor coil former (75 mm), $R_{max}$=outer radius of the rotor coil former (125 mm), d=diameter of copper magnet wire used for the rotor coil (1.7 mm), and $n_s$=number of subdivided sectors of the rotor former (in this case 10).

One may calculate as a first iteration the length $L_{rc}$ of the rotor coil wire in the air gap as follows:

$$L_{rc} = T / (B_g \cdot I_{rc} \cdot \langle R \rangle)$$

If T=178.0 Nm design torque required, $B_g$=1.5 T, $I_{rc}$=25 A chosen peak rotor coil current, and $\langle R \rangle = (R_n + R_{min})/2 = 0.1$ m is set by design estimate above, then $L_{rc}$=47.5 m rotor coil length is estimated to give 250 HP at 10,000 RPM.

These estimates can then be input into a static magnet finite element design software program to confirm the air gap magnetic flux densities and coil resistances. In particular the initial core area=$\pi(R_{max}^2 - R_{max}^2)$ is preserved as described earlier and repeated below with the altered dimensional parameters.

Figure 1B:
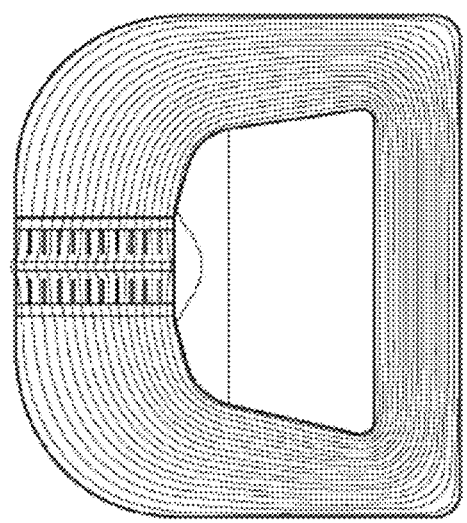
FIG. 1B is a simulation of flux lines of the PCMS rotational motor shown in FIG. 1A.
Figure 1C:
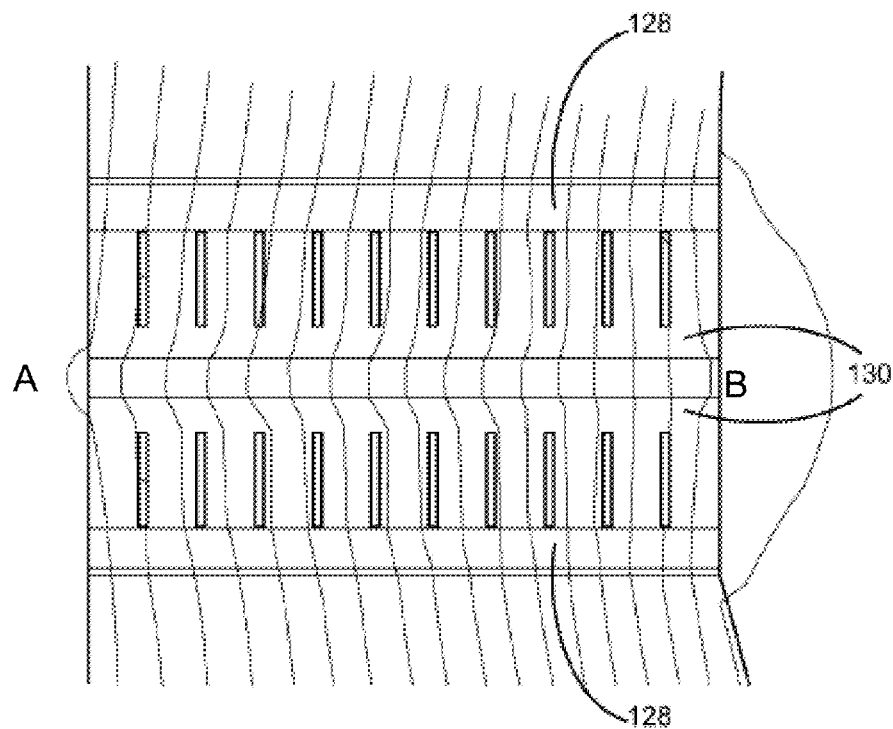
FIG. 1C is a simulation of flux lines of the rotor section of the PCMS rotational motor shown in FIG. 1A.

FIG. 1B is a simulation of flux lines of the PCMS rotational motor 122 shown in FIG. 1A. FIG. 1C is a simulation of flux lines of the rotor 124 section of the PCMS rotational motor shown in FIG. 1A. The flux free coil return cages 126 are shown schematically circumferential, but are actually radial. The rotor 124 comprises the top plates R1 and R4 128 and the rotor coil formers R2 and R3 130 which are all fabricated in SMC ArcoLam 2FHR.

In order to conserve material and maintain an approximately uniform magnetic flux density within the pot core magnet structure 132 along the magnet circuit length, the cross sectional area perpendicular to the lines of flux should remain constant. This can be achieved by ensuring that $r_1/h_1 = r_2/h_2 = r_x/h_x$ where r is radius and h is height of contiguous structure as shown in FIGS. 1A and 1B. Starting from desired rotor 124 coil inner and outer radii $R_{min}$ and $R_{max}$, the optimum geometry for minimum material is determined. The overall radius $r_x$ and height $h_x$ of the actuator is varied to give the desired field coil resistance $R_{fc}$, and inductance $L_{fc}$ within design weight limits. Finite element magnet method magnetics is used to optimize the geometry, generally for maximum Torque T.

The primary drawback of the PCMS rotational motor 122 design is that the rotor needs to be electrically driven. In general this means one needs slip rings and brushes to transfer the high currents into the rotating rotor coil. Though there has been much improvement in slip ring design, this requirement is a drawback compared to modern electric machines, which generally avoid brushes and slip rings by using permanent rare earth NdFeB magnets in their rotors. The answer to this problem for the PCMS motor lies in using one of two classes of remote power deliver systems which can deliver power to rotating machinery by either inductive non-contact coupling using a rotating transformer or capacitive coupling using non-contact rotating interleaved capacitor plates.

The rotational motor described is magnet-less and consequently the requirement for brushes or slip rings with a radially wound rotor can be considered a disadvantage. If a permanent magnet is used instead of the field coil in the pot core magnet structure then the pot core magnet structure may serve as the rotor of an efficient brushless linear response DC motor with the radially wound coil serving as the stator.

Figure 1D:
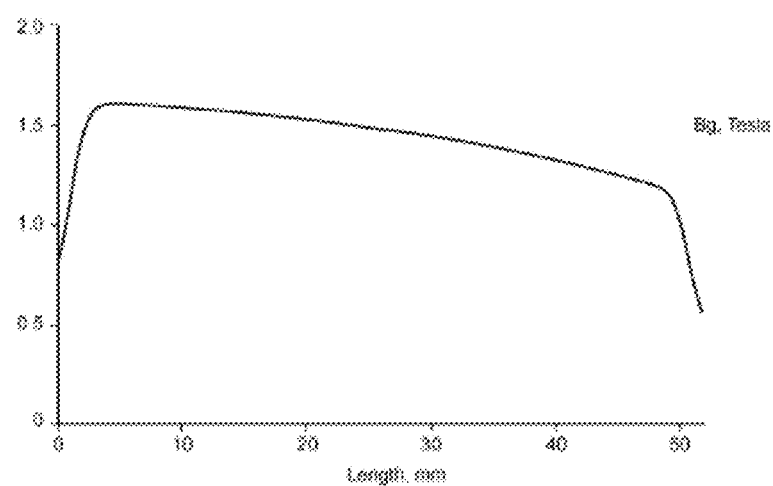
FIG. 1D is a graph showing the magnetic flux density in the rotor coil gap ($B_g$/Tesla) vs. length in mm from points A to B as shown in FIG. 1C.

FIG. 1D is a graph showing the magnetic flux density in the rotor coil gap ($B_g$/Tesla) vs. length in mm from points A to B as shown in FIG. 1C.

Figure 2A:
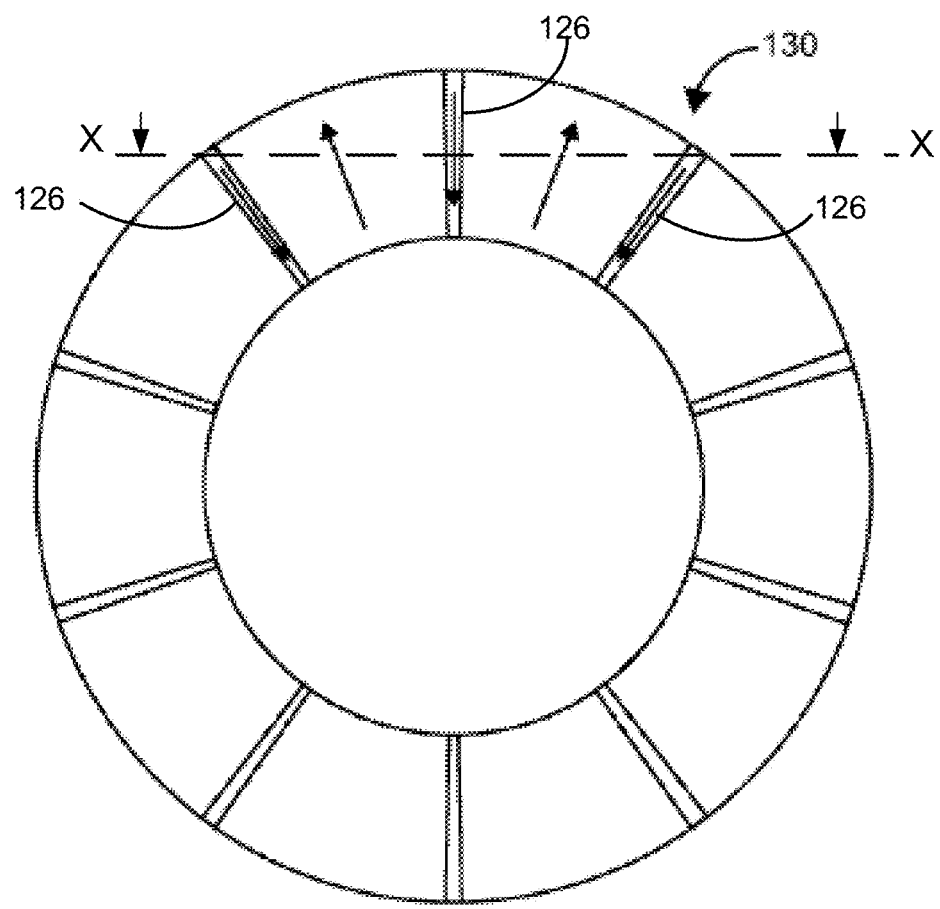
FIG. 2A is a plan view of a PCMS motor rotor coil former.

FIG. 2A is a plan view of a PCMS motor rotor coil former 130. It is the plan view of R2 and R3 rotor former. The two-layer coil is wound radially in section P×10 and then return through the flux free coil return cages Q×10, for example, flux free cages 126.

Figure 2B:
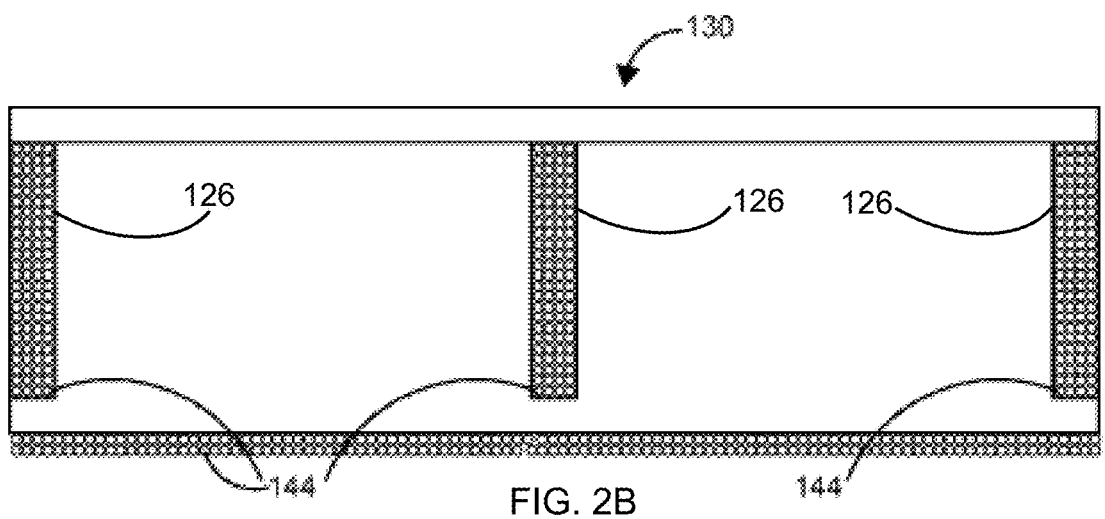
FIG. 2B is a cross-sectional view of a top rotor coil former of FIG. 2A with close pack winding showing return wiring path.

FIG. 2B is a cross-sectional view of a top rotor coil former 130 of FIG. 2A, along the line X-X with close pack winding 144 showing return wiring path through three of the ten flux free cages 126 to ensure unidirectional radial winding within the air gap.

The examples of the pot core motors described herein are efficient and compact and lend themselves to automotive and other vehicle drive trains. In particular their linear response with constant torque at low RPM lends itself to compact, gearless, all-wheel drive, electric vehicle drive trains. In particular the radially wound segments, ten in the examples given but typically varying from between six and twenty four, can be individually driven by separate electronics drivers in parallel such that individual segments may be turned off or kept in generator only mode to save energy. This has the additional benefit of reducing the voltage drive requirements of the system by the number of segments. In other words the radial coil segments may be run in parallel rather than series.

In the case of an all-wheel drive vehicle drive motor it is even possible to use the pot core flux in dual rotation and vibration mode. In other words, a voice coil actuator as described herein is added to the rotation motor in the same pot core magnet structure. The voice coil then can then be directly attached to a hydraulic system to create a vibration force perpendicular to the axis of rotation. This force can be electronically controlled to provide active damping to the spring mounted motor directly attached to the drive wheel.

Because the motor design is a linear response DC rotation motor it should be clear that all the examples given above may be reversed such that components described therein act as efficient electric generators not just for recycling motor energy but in their own right. And the electric generator induced voltage at any given RPM is exactly the Back EMF ($V_{back}$) to be overcome by the motor drive mode and given by Lenz's law:

$$V_{back} = -d\varphi/dt$$

where $\varphi = B_g A_{rc}$ is the magnetic flux swept through area $A_{rc} = L_{rc} \cdot 2\pi \langle R \rangle$ at the RPM frequency. In the motor example given above this would be typically given by:

$$V_{back} = B_g \cdot L_{rc} \cdot 2\pi \langle R \rangle \cdot f_r$$

Where:
$B_g$=Airgap flux density=1.0 T
$L_{rc}$=Total length of the rotor coil in the air gap=47.5 m
$f_r$=10,000 RPM=167 Hz
$\langle R \rangle$=0.1 m
$V_{back}$=4.984 KV In the case where the ten rotor segments are wired in parallel this back EMF would be reduced to about 500V to achieve 10,000 RPM and hence 250 HP.

This doubly fed pot core magnet structure rotational motor 122 generally improves on the performance of existing motors for vehicular drive trains in a number of respects. The linear response direct drive which comes about by choice of SMC core material having minimum hysteresis and eddy current losses provides high torque at all RPMs within the design range. The torque estimate is highly parametric and may be estimated and simulated statically. The control system F(t)=H(t)·G(t) used for magnet-less voice coil actuator (ML VCA) ports directly to the rotational motor. In principle the motor may be driven by variable DC but switch mode drive is very efficient using PWM class-D type drive with in general both channels H(t) and G(t) single ended drive and capable of recirculating energy. The design facilitates easy regenerative braking and energy recirculation using bidirectional semiconductor switches. The pot core magnet structure makes the most efficient use of magnetic energy when the air gap is fully utilized. This design the air gap is near 100% copper. Ferrofluid lubrication is used to minimize the reluctance of the air gaps used to allow rotation. The PCMS rotational motor is compact and readily lends itself to electrical braking and regenerative energy recirculation with little additional circuitry. These features are ideal for all wheel drive systems where the four drive wheels are in effect PCMS motors computer controlled and driven by wire.

The methodology for these other motors as shown with loudspeakers is scalable to virtually any size within the mechanical properties of the materials and in particular very large horsepower linearly controllable rotating motors are feasible for vehicular drivetrains with the possibility of seamless re-circulating braking energy.

Another application of the present invention is in an electric piston engine. The pistons of a typical internal combustion (piston) engine are replaced by magnet-less voice coil actuators (ML-VCAs) driving a crank shaft(s) with one or more ML-VCAs inline vertical, flat horizontal or V format. Many of the prior art and traditional designs for internal combustion piston engines are leveraged because of the similar form factor including, oil lubrication and cooling with enhancements using ferrofluid lubricants, water pumps and cooling systems allowing high RPMs because the electric motors dissipates less heat and not least, the familiarity of the form factor with the massive garage maintenance infrastructure. In effect the ICE pistons and cylinder head and fuel system is replaced by replaced by an array of compact ML-VCAs.

The PCMS rotation motor's primary drawback is that it requires slip rings, brushes or other means to feed electric power into the rotor, be that the field coil or radial coil. In the case described the radial coil is broken into ten segments separately driven in parallel to reduce the operating voltage from about 7.5 KV to 750V and it makes sense for this to be the stator and use the field coil as the rotor as this only needs one power source. Inductive power transfer (IPT) and capacitive power transfer (CPT) may be used but this is complex, expensive and even the very best systems do not exceed 85% to 90% power transfer. A Metamaterial transformer structure which is a high pass transmission line comprising series capacitor and parallel inductor elements can provide non contact power transfer to the power level required and at efficiencies exceeding 95% but these devices are still in development for the most part.

Another alternative for the example of the rotational motor given here is to drive the rotor inductively. In effect the field coil is passively shorted and the changing current in the multi segment stator induces currents in the field coil rotor, which by Lenz's law cause a torque and hence rotation. However this defeats the main power and efficiency advantage of the doubly fed electric motor systems described here. In cases where the power is sufficient from inductive motor version then the geometry, materials and electronics drive benefits of the electric motor systems described here can be leveraged to create induction motors which do not need slip rings, brushes, or the complexities of IPT or CPT.

The ML-VCA described here is doubly fed with controlled power to both the voice coil and the field coil and the vibration action means that power can very easily be fed to the moving voice coil by a simple flexible conductor, say braided copper wire, which can tolerate the maximum displacements of the system. This is very standard in loudspeaker motors which at most have peak to peak displacements of about 1 mm for micro speakers to about 25 mm for very large speakers, particularly those used at low frequencies, sub woofers, where the volume of air displacement is large. But there is no reason why this direct feed through braided or other flexible conductor cannot be extended to 100 mm or more.

It is proposed here that there would be several advantages if the pistons of a conventional Internal Combustion (Piston) Engine were to be replaced by ML-VCA, typically one for each piston to create the Electric Piston Engine (EPE) driven by Electric Piston Motors (EPM). The main difference between this piston motor application of the ML-VCA compared to the loudspeaker application proposed above is that the maximum frequency in this embodiment would be 200 Hz (12000 RPM) and more commonly 125 Hz (7500 RPM) for EPE ML-VCAs compared to 1000 Hz to 2500 Hz even for the very largest 12 in to 18 in loudspeakers. This means that the effects of high accelerations experienced in loudspeaker motors such as very low moving mass for the voice coil are not relevant. For example the voice coil may be clad in very thin high strength magnetically soft stainless steel and ferrofluid used as described above as lubricant. This means that the air gaps and loss of flux can be minimized.

The electronic drive scheme proposed for loudspeaker use is no different other than the frequencies involve are lower by two orders of magnitude. However as can be seen from the analysis below, the voltages and currents are much higher. The electronic circuits with PWM methods are identical but high voltage devices particularly MOSFETs are required. IGBTs may be used with freewheeling diodes to facilitate energy recirculation by the generator action (Back EMF), called Regen in the electric vehicle industry. Having multiple motors that can operate independently as a motor or generator or off helps manage Regen.

This doubly fed Electric Piston Engine generally improves on the performance of existing Internal Combustion (Piston) Engines as well as Electric Rotation Motor Engines for vehicular drive trains in a number of respects. The linear response direct drive which comes about by choice of SMC core material having minimum hysteresis and eddy current losses provides high torque at all RPMs within the design range. The torque estimate is highly parametric and may be estimated and simulated statically. The control system $F(t)=H(t) \cdot G(t)$ used for ML VCA ports directly to the rotational motor. In principle the motor may be driven by variable DC for the field coil and AC in phase with rotation but switch mode drive is very efficient using PWM class-D type capable of recirculating energy using MOSFETs or IGBTs (with freewheeling diodes).

The design facilitates easy regenerative braking and energy recirculation using bidirectional semiconductor switches. The pot core magnet structure makes the most efficient use of magnetic energy when the air gap is fully utilized. In this design the air gap is near 100% copper. Ferrofluid lubrication is used to minimize the reluctance of the air gaps used to allow vibration of the voice coil. The PCMS rotational motor is compact and readily lends itself to electrical braking and regenerative energy recirculation with little additional circuitry required. These features are ideal for all wheel drive systems where the four drive wheels are in effect PCMS motors computer controlled and driven by wire. Much of the prior art for traditional internal combustion piston engines is leveraged because of the similar form factor including, oil lubrication and cooling with enhancements using ferrofluid lubricants, water pumps and cooling systems allowing high revs because the electric motors dissipates less heat and not least, the familiarity of the form factor with the massive garage maintenance infrastructure.

The Electric Piston Engine (EPE) described above lends itself to a hybrid engine with both ML-VCAs combustion piston motors driving a common crankshaft. Lubrication and cooling systems can be shared and the system is ideally suited to Regen.

The 4 stroke ICE only delivers power on the combustion stroke of the engine. Whereas the ML-VCA delivers power on all for cycles when it is on a shared crankshaft so fewer cylinders need to be engaged. In fact a single cylinder ML-VCA EPE is quite feasible. A typical 6 cylinder system would run say 4 conventional internal combustion piston cylinder and the other 2 would be operated by ML-VCAs. The design would be little different from the one shown above with the ML-VCA delivering say 250 HP and the 4 cylinders ICE delivering also 250 HP.

The lubrication system could be shared as conventional synthetic oils could operate in the ML-VCAs. Ferrofluids have also been considered as lubricants for conventional engines and it would be possible to have a common lubricant and oil pump.

Figure 3A:
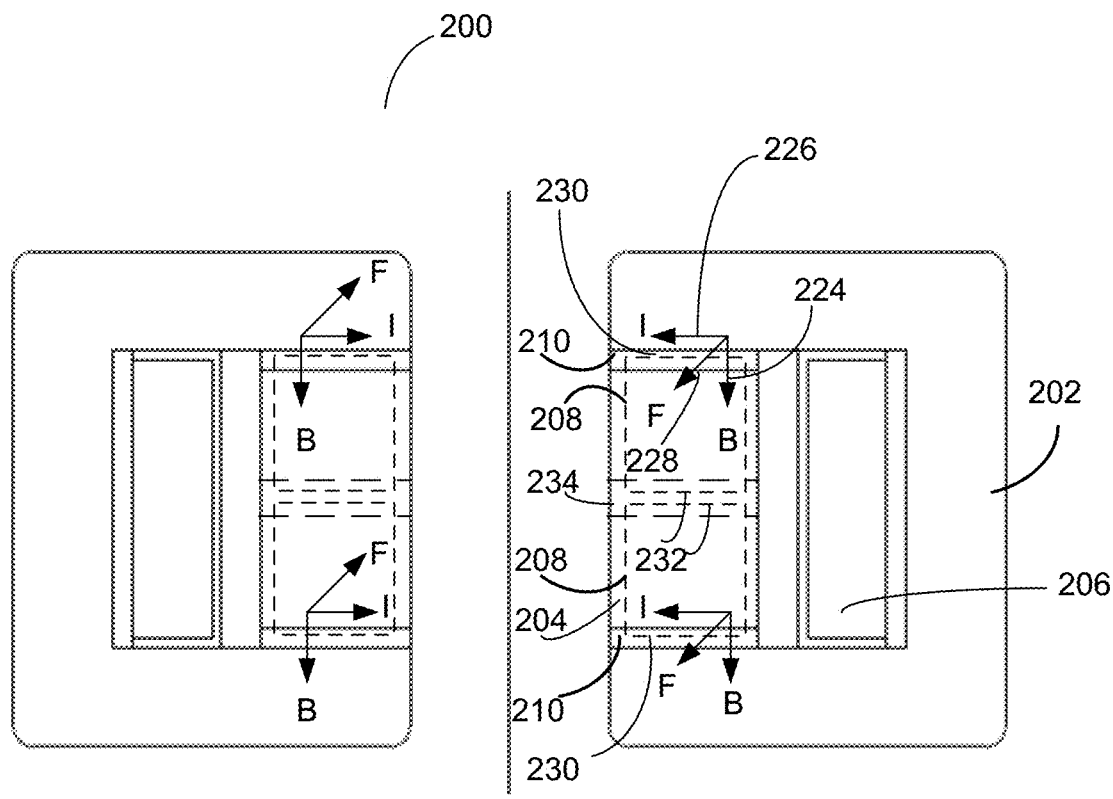
FIG. 3A is a cross-section of an example direct current induction motor (DCIM motor) with two air gaps.

Now, referring to FIG. 3A, is a cross-sectional view of an axisymmetric schematic depiction of a motor 200 according to an alternate embodiment of the present invention. The motor 200 may sometimes be referred to as a direct current induction motor or DCIM motor. The motor 200 includes a stator core 202 and a rotor core 204. The stator core 202 and rotor core 204 may be made of a magnetically soft ferromagnetic material with high induction and low eddy current and hysteresis loss. For example, the stator core 202 and rotor core 204 may be made of soft magnetic composite ArcoLam 2FHR. In some examples, the stator core 202 and rotor core 204 material may be referred to as a material exhibiting low magnetic reluctance. A field coil 206 is wound over the stator core 202. When the field coil 206 is periodically energized, a magnetic field is generated. In this example, the rotor core 206 includes a pair of rotor rings 208. In this example, the motor 200 includes two air gaps 210. In some examples, the air gap 210 may include a non-magnetic material, for example, aluminum. A portion of the rotor ring 208 is disposed in the air gap 210. In some examples, the non-magnetic material may be part of the rotor ring 210. As one skilled in the art appreciates, when the field coil 206 is periodically energized, a magnetic field is generated. The generated magnetic field induces a current in the rotor ring 210. Based on the magnetic field B and the direction of the induced current I, a Lorentz force F is generated. This force F generates a torque in the air gap. This principle will be further explained with reference to FIG. 3B.

Figure 3B:
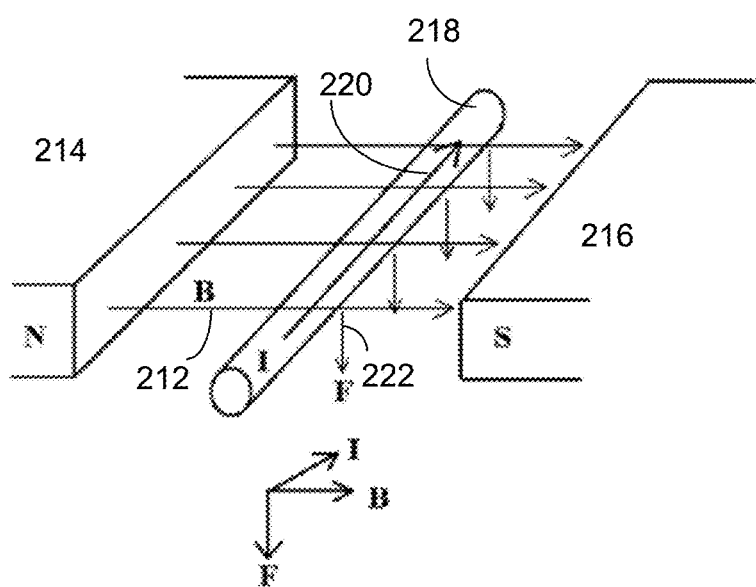
FIG. 3B is a diagram showing relationship between a current induced in a conductor due to an external magnetic field and corresponding lorentz force.

Now, referring to FIG. 3B, a magnetic field B is generated in the direction as shown by line 212. In this example, the magnetic field B is generated in the direction shown by line 212. In one example, the magnetic field B is generated due to a first magnet 214 and a second magnet 216 disposed such that the north pole of first magnet 214 is facing the south pole of the second magnet 216. A conductor 218 is disposed between the first magnet 214 and second magnet 216. The conductor 218 is disposed along the line 220, which is substantially perpendicular to the direction of the magnetic field along the line 212.

As one skilled in the art appreciates, if the direction of the current I flowing in conductor 218 is along the line 220, a Lorentz force F is generated along the line 222, which is perpendicular to the line 212 and 220. In this example, the arrow in line 212 represents the direction of the magnetic field, the arrow in line 220 represents the direction of the flow of current I and arrow in line 222 represents the direction of the Lorentz force generated. Sometimes, this principle is referred to as Fleming's left hand rule. As one skilled in the art appreciates, magnetic field B may also be induced by passing a periodic current through a coil, instead of using first permanent magnet 214 and second permanent magnet 216. Having described the relationship between magnetic field B, induced current I and force F, the construction and operation of the motor 200 will now be described.

Now, referring back to FIG. 3A, the field coil 206 is periodically energized to generate a magnetic field B in the direction shown by line 224. Current I is induced in the rotor ring 208. For example, the induced current I passes portion 230 of the rotor ring 208 in a direction shown by line 226. Force F is induced in the direction shown by line 228. In the portion 232 of the rotor ring 208, the induced current I flows in a direction substantially opposite to the direction of the flow of current I in portion 230 of the rotor ring 208. If the portion 232 of the rotor ring 208 is subjected to the magnetic field B, a force will be generated in a direction opposite to the direction shown by line 228. This opposite force would cancel the force F generated in the direction shown by line 228. In one example, the portion 232 of the rotor ring 208 is positioned such that the portion 232 is not subjected to the magnetic field B. For example, the portion 232 of the rotor ring 208 may be disposed in a high reluctance portion 234 of the rotor. In the exemplary motor 200, the portions 232 of both the rotor rings 208 are positioned in the high reluctance portion 234 of the rotor. As one skilled in the art appreciate, no force is generated due to the current I flowing through the portions 232 of both the rotor rings 208. Thus, a torque is generated in only one direction due to the force F along the line 228. This torque results in the rotor rotating relative to the stator.

Figure 3C:
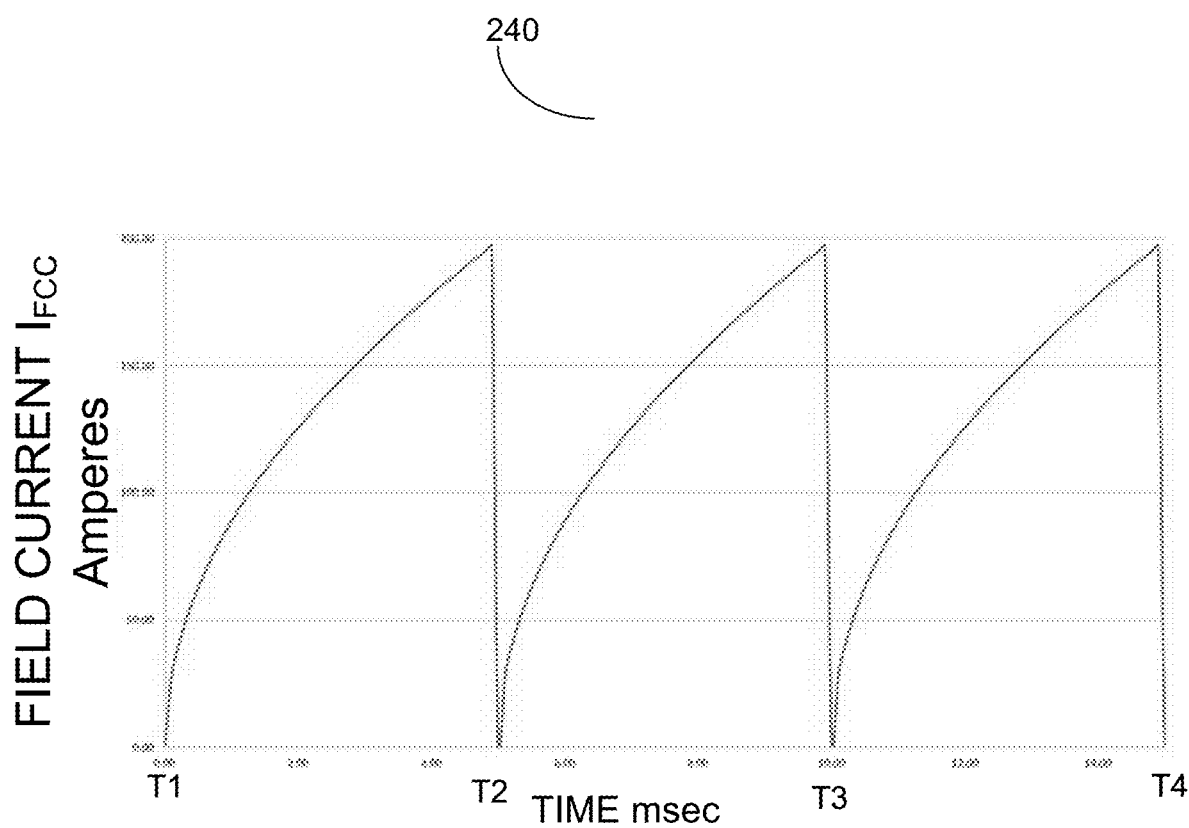
FIG. 3C shows a graph of field current flowing through a stator coil of an example DCIM motor, over time.

Now, referring to FIG. 3C, an example graph 240 showing the relationship between field coil current $I_{FCC}$ over time that is applied to the field coil of the stator. As previously described, this field coil current $I_{FCC}$ generates a magnetic field. In graph 240, X axis depicts time t in milliseconds and Y axis depicts field coil current $I_{FCC}$ in Amperes. In this example, the field coil current $I_{FCC}$ resembles a saw tooth wave form and periodically increases from a low value to a high value in a given period and resets to a low value. For example, between time periods T1-T2, T2-T3 and T3-T4, the field coil current $I_{FCC}$ increases from a low value of zero to about 200 Amps and resets to a value of zero. In some examples, the time periods T1-T2, T2-T3 and T3-T4 may be same. In some examples, the time periods T1-T2, T2-T3 and T3-T4 may be different. In other words, the frequency of the field coil current $I_{FCC}$ may be constant or variable, depending upon the application. An example field coil drive circuit to generate the field coil current $I_{FCC}$ is described with reference to FIG. 3D.

Figure 3D:
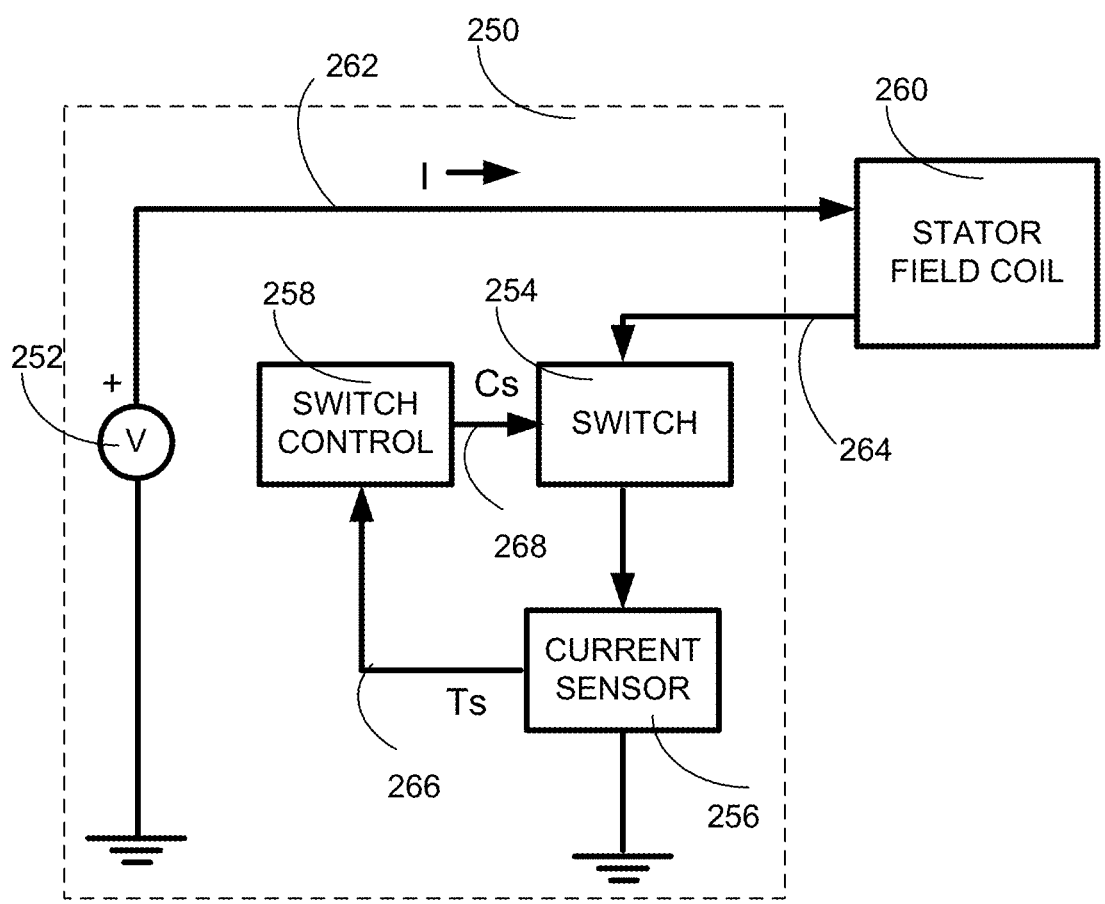
FIG. 3D shows an example field coil drive circuit to generate field current as shown in FIG. 3C.

Now, referring to FIG. 3D, an example field coil drive circuit 250 is shown. The field coil drive circuit includes a voltage source 252, a switch circuit 254, a current sensor circuit 256 and a switch control circuit 258. Voltage source 252 is coupled to one end of the stator field coil 260 over link 262. Other end of the stator field coil 260 is coupled to the switch circuit 254 over link 264. When the switch circuit 254 is enabled (or closed), current I flows through the stator field coil 260. When the switch circuit 254 is disabled (or open), no current flows through the stator field coil 260.

The current sensor circuit 256 is coupled in series with the switch circuit 254 to measure the current I flowing through the stator field coil 260. The current sensor circuit 256 is configured to generate a trigger signal Ts when the current I flowing through the stator field coil 260 reach a certain threshold value, for example, Imax. The trigger signal Ts is communicated to switch control circuit 256 over link 266. Based on the trigger signal Ts, the switch control circuit 256 is configured to generate a control signal Cs that is communicated to the switch circuit 254 over link 268. Based on the control signal Cs, the switch circuit 254 is selectively enabled or disabled.

As one skilled in the art appreciates, the stator field coil 260 includes a resistance component R and an inductance component L. When a voltage V is applied to the stator field coil 260 and switch circuit 254 is enabled (for example, based on control signal Cs), the current I flows through the stator field coil 260 and ramps up. When the current through the stator field coil 260 reaches a pre-set value, for example, Imax, the current sensor circuit 256 generates the trigger signal Ts. Based on the trigger signal Ts, the switch control circuit 258 generates a control signal Cs to disable (or open) the switch circuit 254. When the switch circuit 254 is opened, no current flows through the stator field coil 260. By selectively enabling and disabling the switch circuit 254, current I flowing through the stator field coil 260 will be similar to the field coil current $I_{FCC}$ as described with reference to FIG. 3C.

In some examples, the voltage source 252 may be a DC voltage source. The voltage V may range from about 100 volts to about 1000 volts. The current Imax may be of the order of about 100 amps. The switch circuit 254 may include a MOSFET or IGBT type switch. The current sense circuit 256 may include a sense resistor Rs, which may be of the order of about 10 mOhms. The resistance R of the stator field coil 260 may be of the order of about 750 mOhm. The inductance L of the stator field coil 260 may be of the order of about 2.5 mH.

Figure 3E:
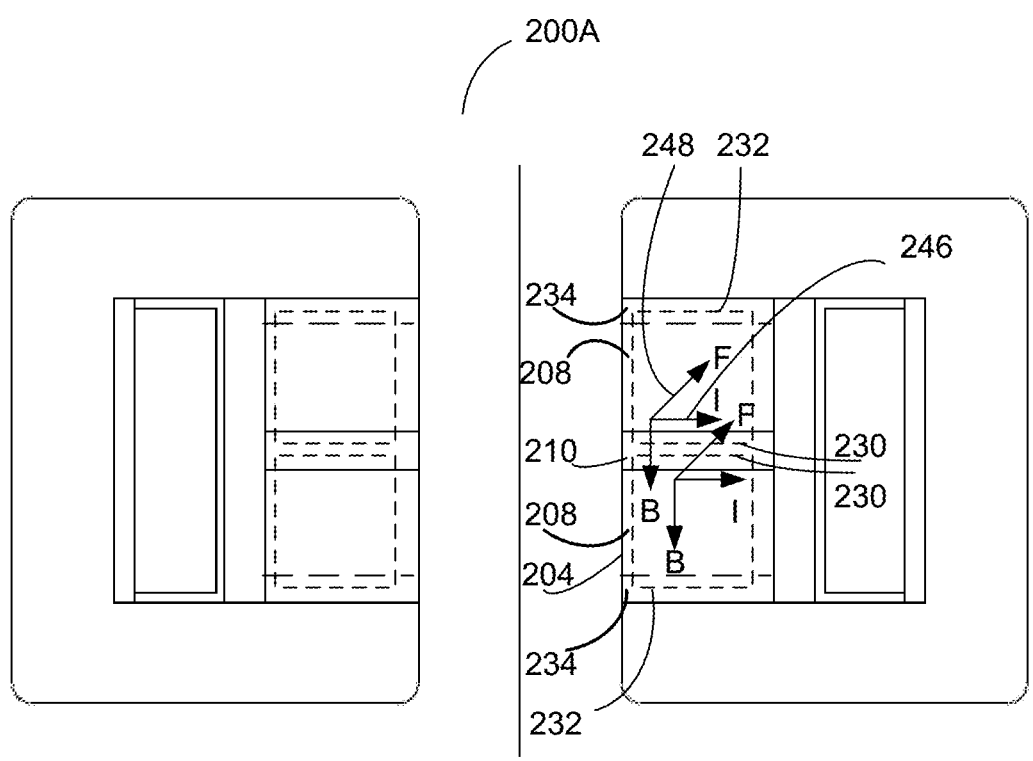
FIG. 3E is another example DCIM motor with a single air gap.

As one skilled in the art appreciates, exemplary DCIM motor 200 described with reference to FIG. 3A may be arranged with a single air gap and a pair of rotor rings. For example, referring to FIG. 3E, an example DCIM motor 200A includes a single air gap 210 and a pair of rotor rings 208 disposed in the rotor core 204. Current I is induced in the rotor ring 208. For example, the induced current I passes portion 230 of the rotor ring 208 in a direction shown by line 246. Force F is induced in the direction shown by line 248. In the portion 232 of the rotor ring 208, the induced current I flows in a direction substantially opposite to the direction of the flow of current I in portion 230 of the rotor ring 208. If the portion 232 of the rotor ring 208 is subjected to the magnetic field B, a force will be generated in a direction opposite to the direction shown by line 248. This opposite force would cancel the force F generated in the direction shown by line 248. In one example, the portion 232 of the rotor ring 208 is positioned such that the portion 232 is not subjected to the magnetic field B. For example, the portion 232 of the rotor ring 208 may be disposed in a high reluctance portion 234 of the rotor. In the exemplary motor 200A, the portions 232 of both the rotor rings 208 are positioned in the high reluctance portion 234 of the rotor. As one skilled in the art appreciate, no force is generated due to the current I flowing through the portions 232 of both the rotor rings 208. Thus, a torque is generated in only one direction due to the force F along the line 248. This torque results in the rotor rotating relative to the stator.

Figure 3F:
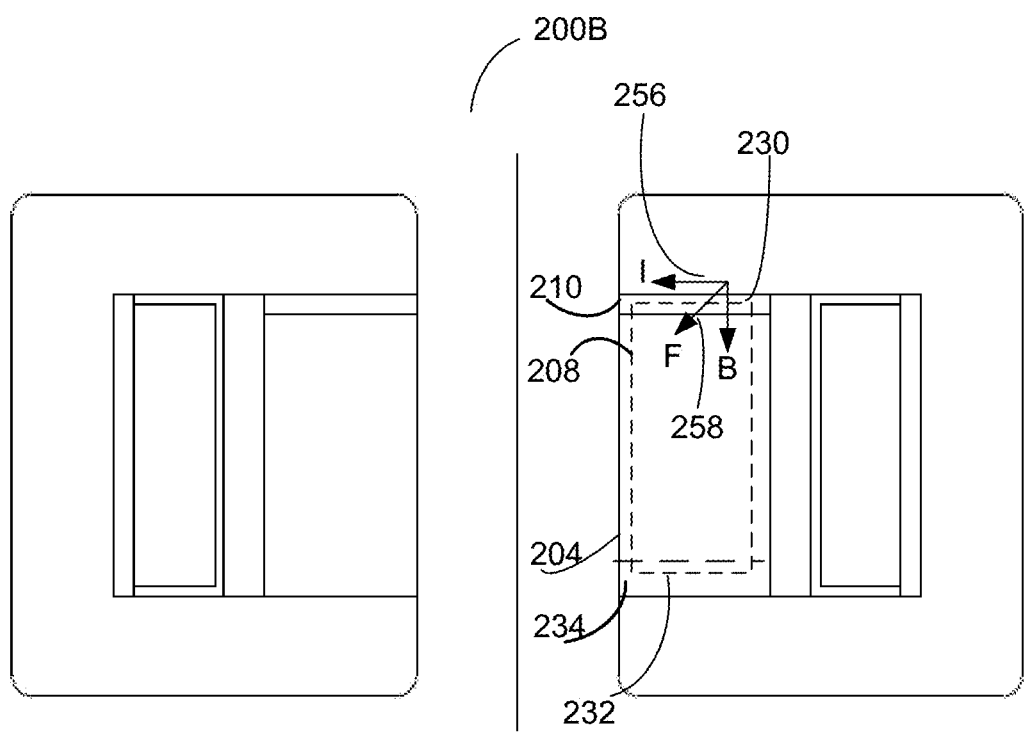
FIG. 3F is yet another example DCIM motor with a single air gap.

Now referring to FIG. 3F, another example DCIM motor 200B which includes a single air gap 210 and a single rotor ring 208 disposed in the rotor core 204 is described. Current I is induced in the rotor ring 208. For example, the induced current I passes portion 230 of the rotor ring 208 in a direction shown by line 256. Force F is induced in the direction shown by line 258. In the portion 232 of the rotor ring 208, the induced current I flows in a direction substantially opposite to the direction of the flow of current I in portion 230 of the rotor ring 208. If the portion 232 of the rotor ring 208 is subjected to the magnetic field B, a force will be generated in a direction opposite to the direction shown by line 258. This opposite force would cancel the force F generated in the direction shown by line 258. In one example, the portion 232 of the rotor ring 208 is positioned such that the portion 232 is not subjected to the magnetic field B. For example, the portion 232 of the rotor ring 208 may be disposed in a high reluctance portion 234 of the rotor. As one skilled in the art appreciate, no force is generated due to the current I flowing through the portion 232 of the rotor ring 208. Thus, a torque is generated in only one direction due to the force F along the line 258. This torque results in the rotor rotating relative to the stator.

As one skilled in the art appreciates, other variations to the DCIM motor described herein may be implemented. For example, DCIM motors with a plurality of rotor rings and a plurality of air gaps may be constructed based on the teachings of this disclosure. For example, by selectively positioning portions of the rotor ring where current flows in a direction opposite to the direction of current in the portion of the rotor ring disposed in the air gap, force is generated in a single direction so as to generate a torque to rotate the rotor with reference to the stator.

Figure 4:
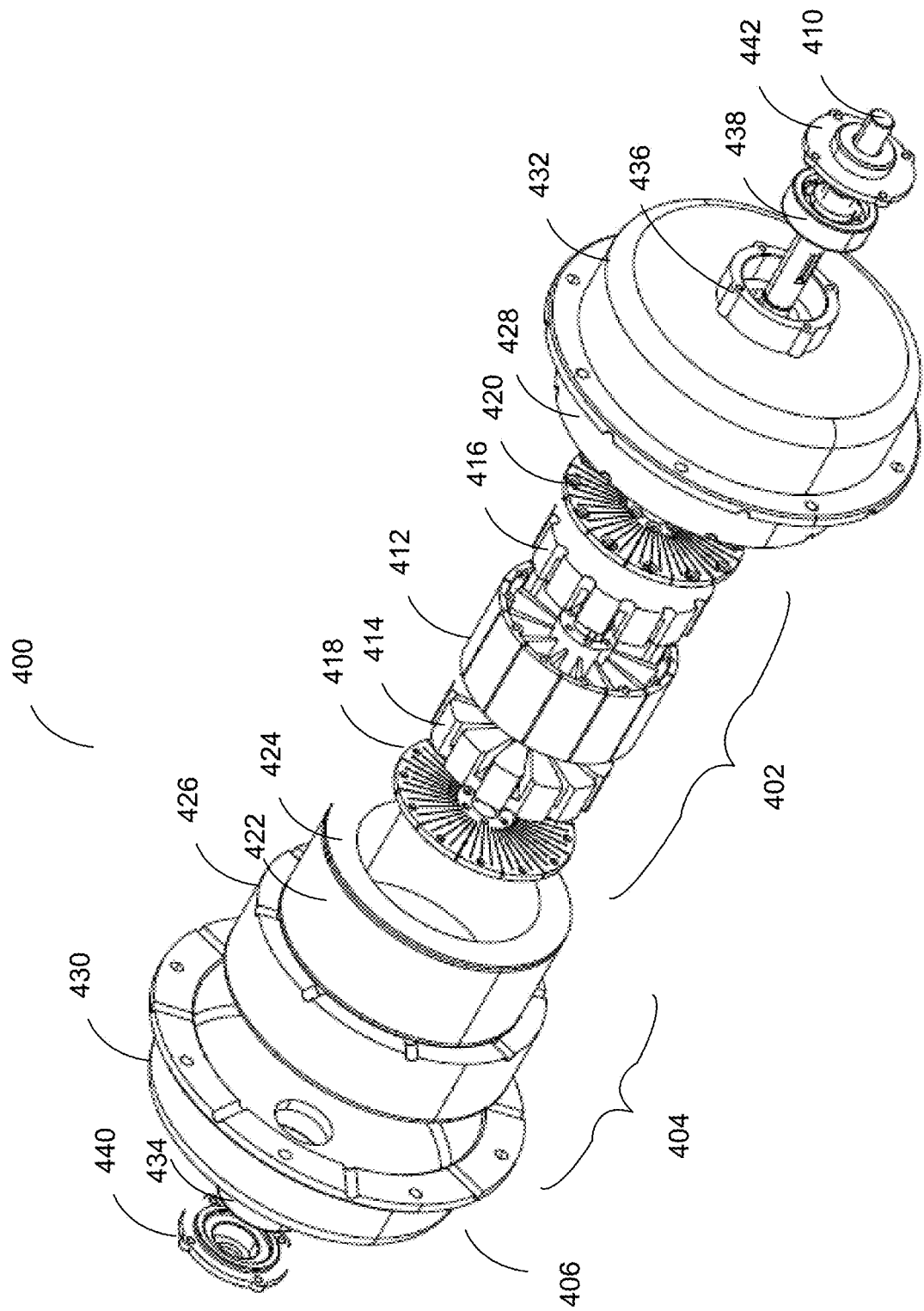
FIG. 4 is a partial exploded view of another example DCIM motor.

Now, referring to FIGS. 4 and 4A-4G another example DCIM motor 400 will be described. FIG. 4 shows a partial exploded view of the DCIM motor 400. The DCIM motor 400 is similar to DCIM motor 200 shown in FIG. 3A in that the DCIM motor 400 has two air gaps. Further similarities and differences between DCIM motor 200 and DCIM motor 400 will be described later.

DCIM motor 400 includes a rotor assembly 402, a stator assembly 404, a motor cover assembly 406, a bearing assembly 408 and a rotor shaft 410. The rotor assembly 402 includes a rotor cage 412, a top rotor core 414, a bottom rotor core 416, a top cover plate 418 and a bottom cover plate 420. The stator assembly 404 includes a stator field coil 422 wound on a stator field coil bobbin 424, a top stator core 426 and a bottom stator core 428. Construction and features of the rotor assembly 402 and stator assembly 404 will be later described in detail.

Motor cover assembly 406 includes a top motor cover 430 and a bottom motor cover 432. The top motor cover 430 and bottom motor cover 432 are configured to enclose the stator assembly 404 and rotor assembly 402. Upon assembly, top motor cover 430 and bottom motor cover 432 are fastened together to hold the rotor assembly 402 and stator assembly 404 together in operative condition. The top motor cover 430 includes a top bearing well 434 and bottom motor cover 432 includes a bottom bearing well 436, both configured to receive a bearing. For example, bottom bearing well 436 is configured to receive bottom bearing 438. Bearings are covered and retained in place by a bearing cover. For example, top bearing (not shown) is covered and retained by the top bearing cover 440. Similarly, bottom bearing 438 is covered by bottom bearing cover 442. Rotor shaft 410 is coupled to the rotor assembly 402 and rotatably held by the bearings. Motor cover assembly 406 may further include one or more connectors (not shown) to selectively energize the stator field coil 422.

Figure 4A:
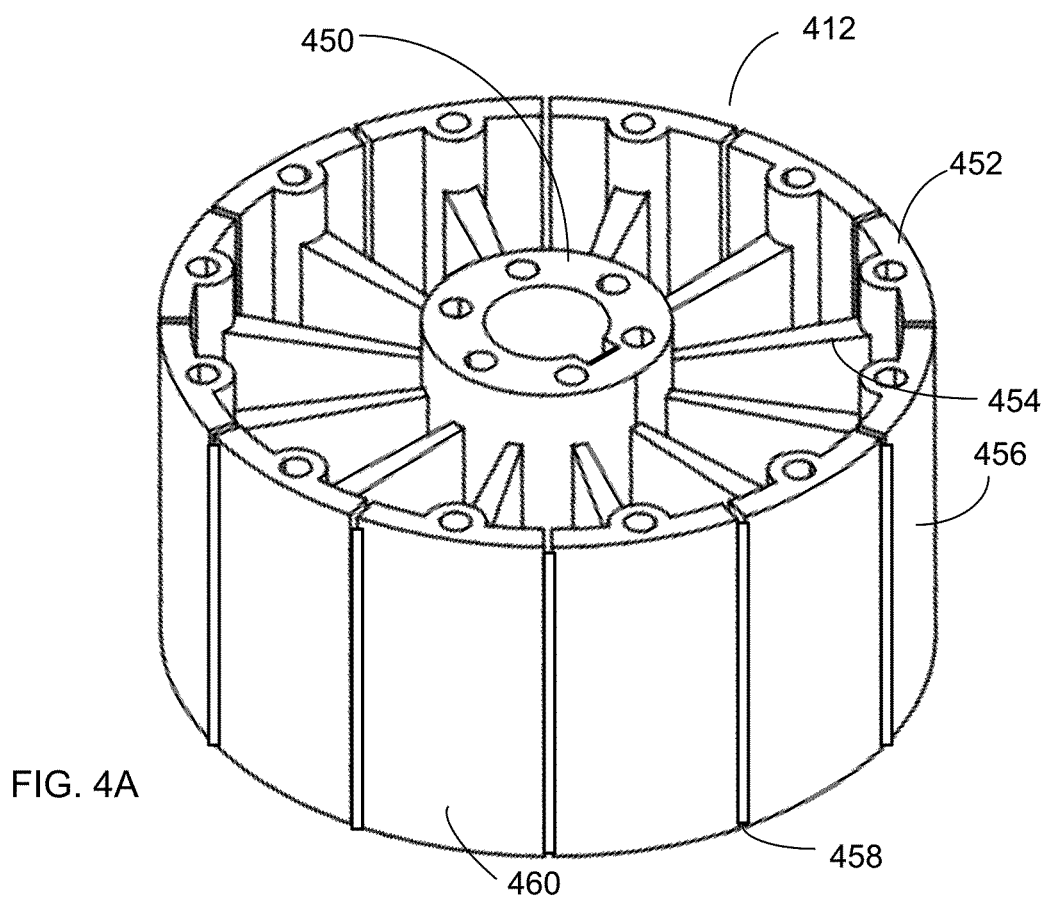
FIG. 4A is a perspective view of a rotor core of the example DCIM motor shown in FIG. 4.
Figure 4B:
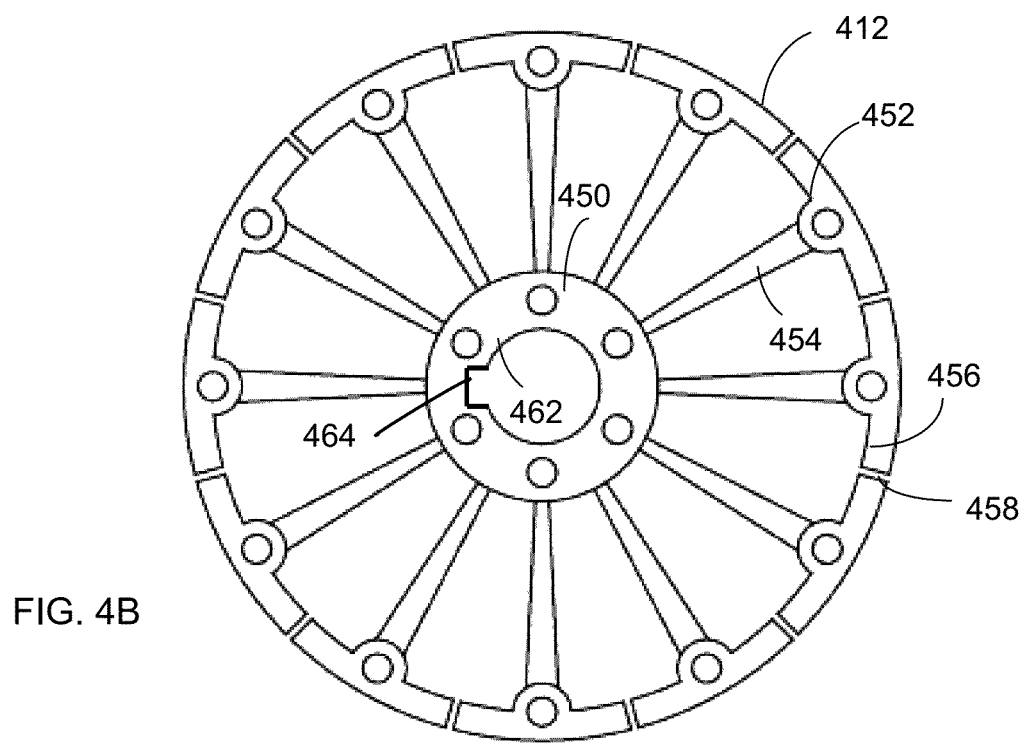
FIG. 4B is a top view of the rotor core of FIG. 4A.

Now, referring to FIGS. 4A and 4B, rotor cage 412 will be described. FIG. 4A shows a perspective view of the rotor cage 412 and FIG. 4B shows the top view of the rotor cage 412. Now, referring to FIG. 4A and FIG. 4B, the rotor cage 412 includes a hub portion 450 and a plurality of radially extending rotor ring segments 452. Each of the rotor ring segment 452 includes an arm portion 454 and a body portion 456. In one example, the arm portion 454 radially extends from the hub portion 450 to the body portion 456. Adjacent body portion 456 are separated by a rotor ring segment gap 458. In one example, external surface 460 of the body portion 456 is curved and all the external surfaces of the body portions together form a substantially cylindrical surface. Rotor cage 412 is made of a conductive material. The hub portion 450 includes a bore 462 and a key slot 464. As one skilled in the art appreciates, rotor shaft (as previously disclosed with reference to FIG. 4) may be configured to be disposed in the rotor cage bore 462 and a key (not shown) may be disposed in the key slot 464 to couple the rotor shaft to the rotor cage 412. In one example, the arm portion 454 corresponds to the portion 232 of the rotor ring 208 described with reference to FIG. 34-GA. As previously described, the arm portion 454 is configured such that the arm portion 454 is not subjected to the magnetic field generated by the stator field coil 422. For example, by placing the arm portion 454 in a high reluctance portion. This will be further described with reference to FIG. 4C and FIG. 4D.

Figure 4C:
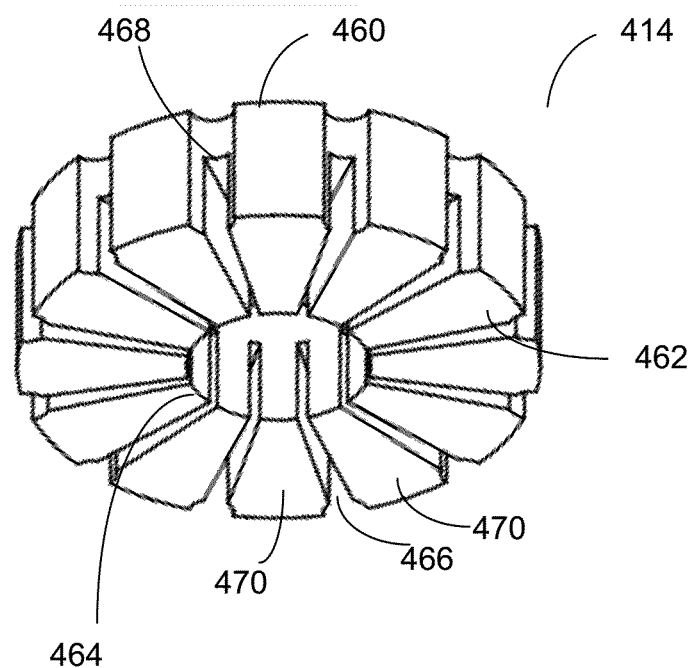
FIG. 4C is a perspective view of a rotor cage of the example motor shown in FIG. 4.
Figure 4D:
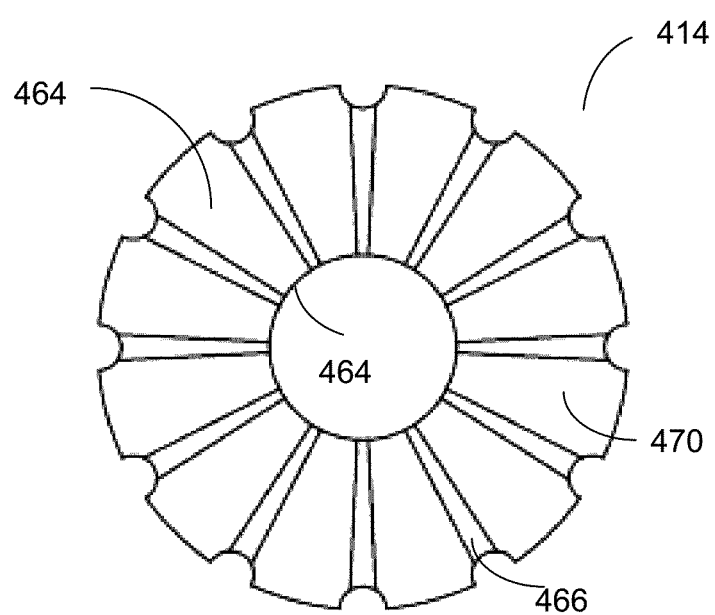
FIG. 4D is a top view of the rotor cage of FIG. 4C.

Now, referring to FIG. 4C and FIG. 4D, an example construction of the top rotor core 414 will be described. Bottom rotor core 416 is constructed similar to the the top rotor core 414. FIG. 4C shows a perspective view of the top rotor core 414. FIG. 4D shows bottom view of the top rotor core 414. Top rotor core 414 includes a top core surface 460, a bottom core surface 462 and a rotor core bore 464 extending from the top core surface 460 to the bottom core surface 462. The top rotor core 414 includes a plurality of slots 466. Plurality of slots 466 extend radially from the bottom core surface 462 to a middle portion 468 of the top rotor core 414, defining a plurality of rotor core segments 470. In one example, the plurality of slots 466 extend up to the rotor core bore 460. As one skilled in the art appreciates, the plurality of slots 466 are configured to form a high reluctance portion.

The top rotor core 414 is configured to be slid into the rotor cage 412 so that plurality of arm portion 454 of the rotor cage 412 are disposed in the plurality of slots 466 of the top rotor core 414. As the plurality of arm portion 454 are placed in the high reluctance portion of the top rotor core 414, the plurality of arm portion 454 are not subjected to a magnetic field, when the stator coil is selectively energized. As one skilled in the art appreciates, the width of the plurality of slots 466 (for example, gap between two rotor ring segments) and the depth of the plurality of slots 466 (for example, the distance between the bottom core surface 462 and the middle portion 468) are chosen such that a high reluctance portion is substantially maintained around the arm portion 454 disposed in the plurality of slots 462.

As one skilled in the art appreciates, the bottom rotor core 416 is constructed similar to the top rotor core 414. The bottom rotor core 416 is configured to slide into the rotor cage 412 so that plurality of arm portion 454 of the rotor cage 412 are disposed in the plurality of slots of the bottom rotor core 416. As the plurality of arm portions are placed in the high reluctance portion of the bottom rotor core 416, the plurality of arm portions 454 are not subjected to a magnetic field, when the stator coil is selectively energized. Next, the top cover rotor cover plate 418 and bottom rotor cover plate 420 are assembled over the top rotor core 414 and bottom rotor core 416 respectively to form the rotor assembly 402. Top rotor cover plate 418 will now be described with reference to FIG. 4E. Bottom rotor cover plate 420 is similarly constructed.

Figure 4E:
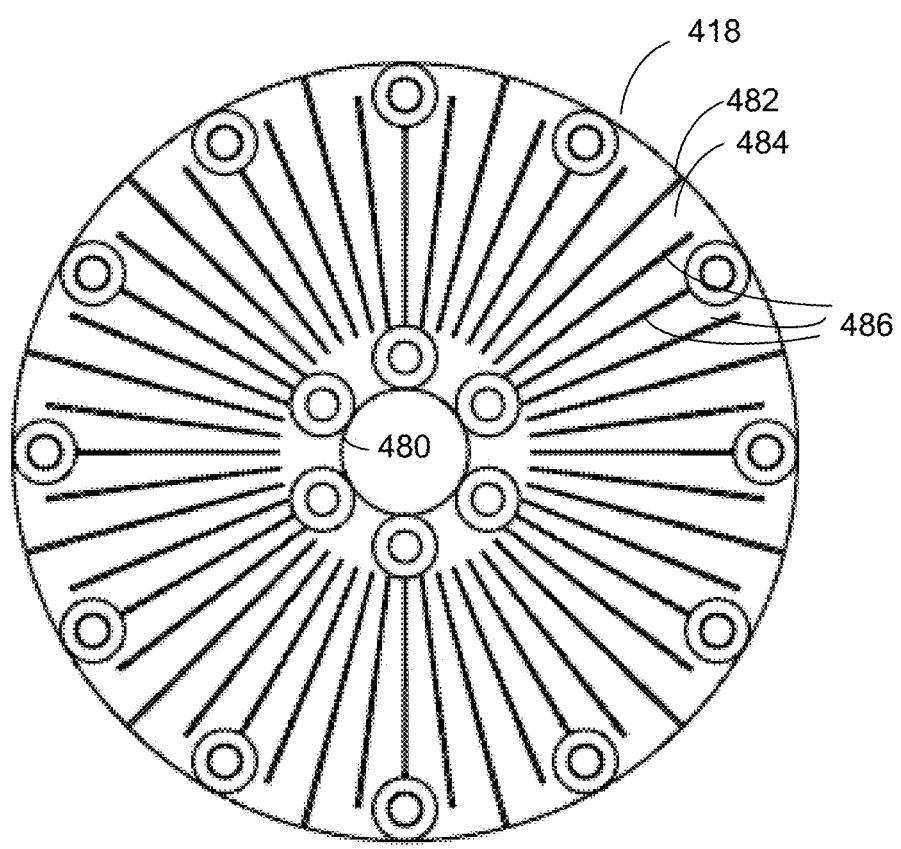
FIG. 4E is a top view of a cover plate of the rotor of the example motor shown in FIG. 4.

Now, referring to FIG. 4E, an example top rotor cover plate 418 will be described. Top rotor cover plate 418 includes a top cover plate bore 480 and a plurality of radially extending top cover plate slots 482, to form a plurality of top cover plate segments 484. Each of the top cover plate slot 482 corresponds to a rotor ring segment gap 458 (shown in FIGS. 4A and 4B). Each of the top cover plate segment 484 is configured to be electrically coupled to a corresponding rotor ring segment 452 (shown in FIGS. 4A and 4B). In one example, the top cover plate 418 has a cylindrical disk profile that corresponds to the cylindrical profile of the rotor cage 412.

The top cover plate 418 is made of a conductive material that is non-magnetic, for example, Aluminum. In some examples, a thickness of the top cover plate 418 defines an air gap. In one example, each of the top cover plate segment 484 may correspond to the portion of the rotor ring 208 disposed in the air gap 210 as described with reference to FIG. 3A. In some examples, each of the top cover plate segment 484 may include a plurality of radially extending sub slots 486. In some examples, the radially extending sub slots 486 do not extend all the way to a periphery of the top rotor cover plate, thereby dividing the top cover plate segment 484 into a plurality of radially extending sub segments 488. In some examples, the plurality of radially extending sub segments 488 permit induced current to flow along a radius of the top rotor cover plate 418.

Figure 4F:
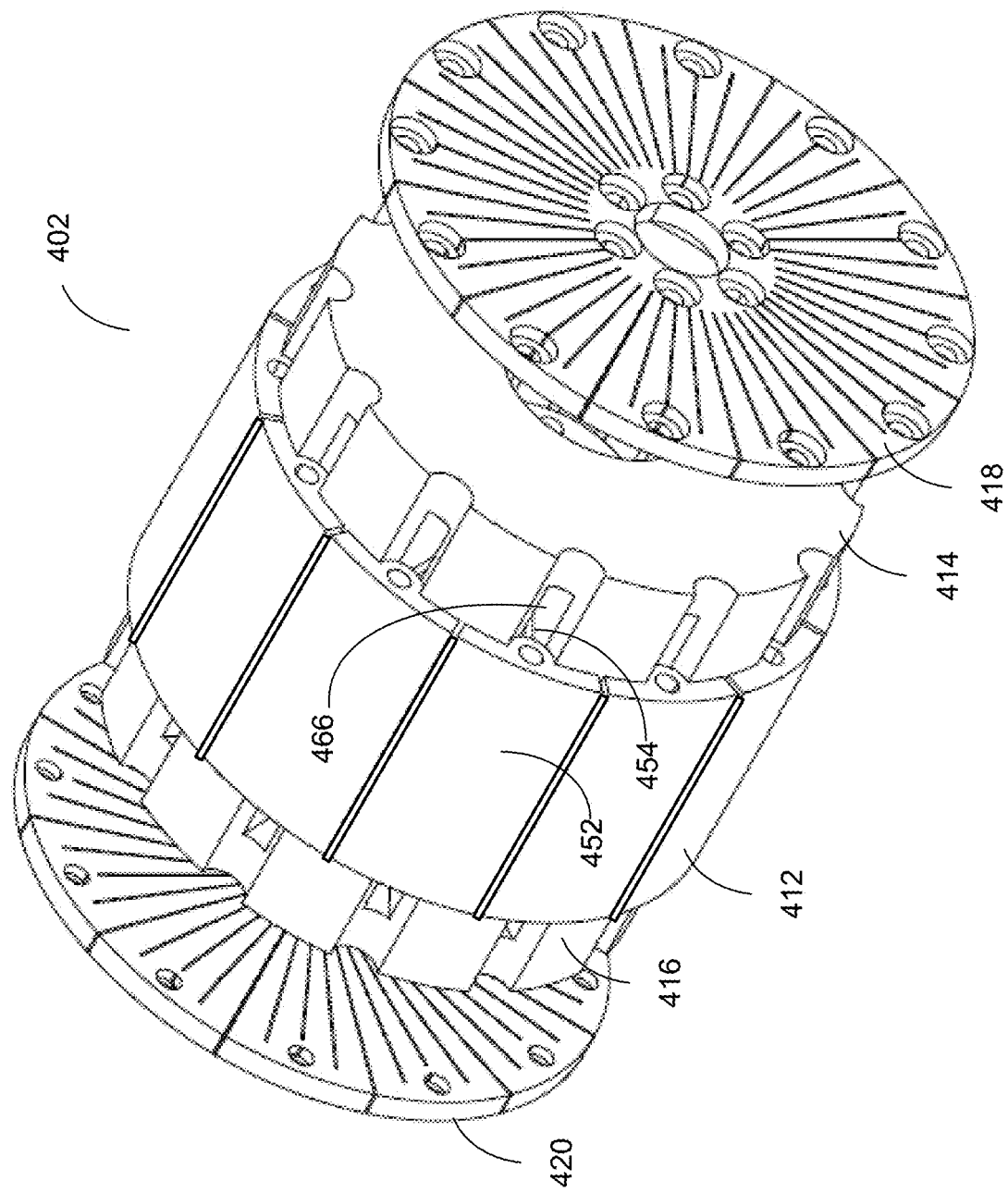
FIG. 4F is a perspective view of a partially assembled rotor of the motor shown in FIG. 4.

Now, referring to FIG. 4F, a partially assembled rotor assembly 402 is described. FIG. 4F shows rotor cage 412, bottom rotor core 416 and top rotor core 414 partially inserted into the rotor cage 414, with top rotor cover plate 418 and bottom rotor cover plate 420 disposed in an aligned but spaced apart relationship with the top rotor core 414 and bottom rotor core 416. Further, arm portion 454 of the rotor ring segment 452 is partially disposed in the slot 466 of the rotor cage 412. Upon assembly, the bottom rotor core 416 and top rotor core 414 are completely inserted into the rotor cage 412. Assembly of the top cover plate 418 and bottom cover plate 420 will now be described with reference to FIG. 4G.

Figure 4G:
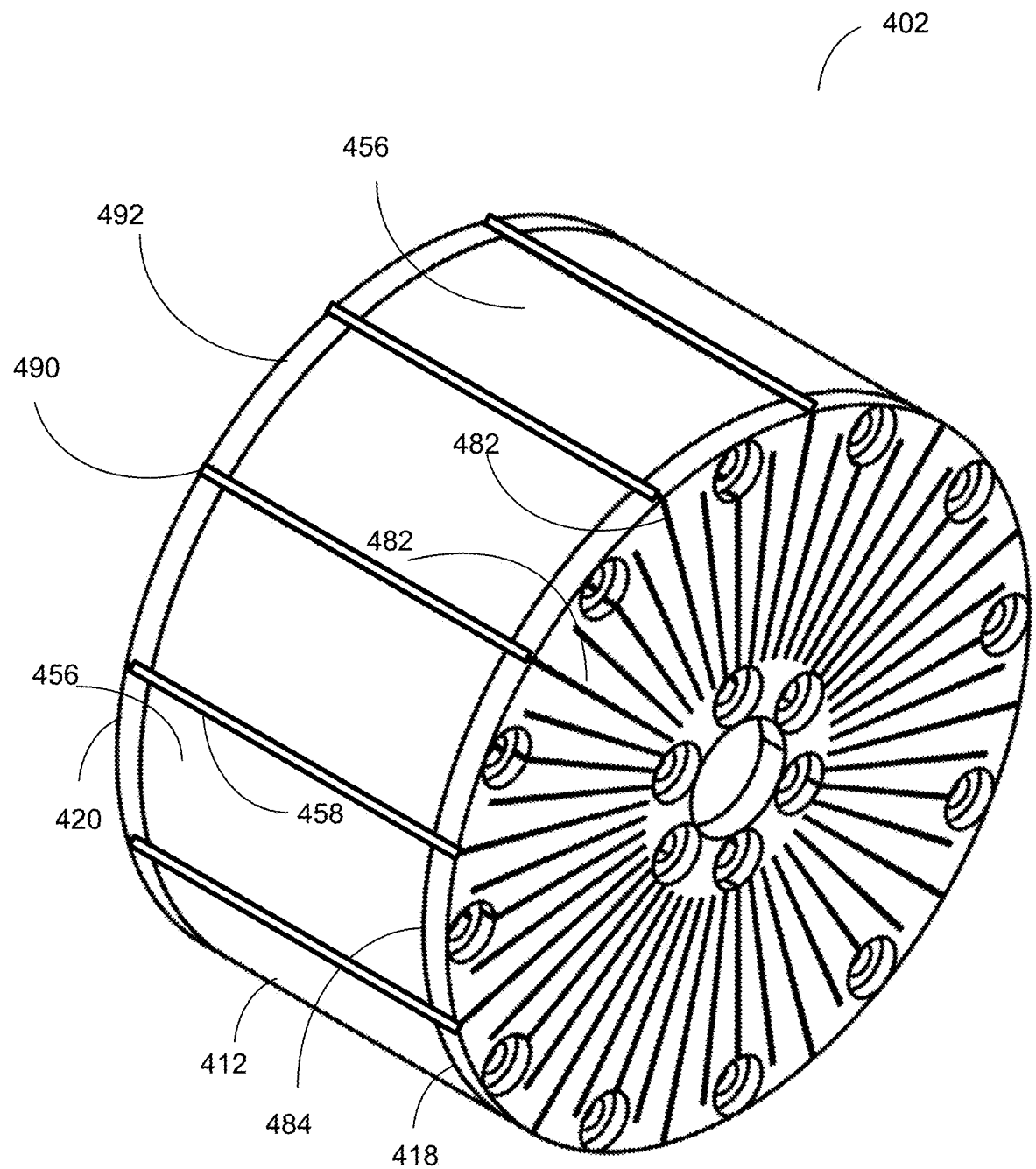
FIG. 4G is a perspective view of a fully assembled rotor of the motor shown in FIG. 4.

Now, referring to FIG. 4G, a fully assembled rotor assembly 402 is described. FIG. 4G shows rotor cage 412 sandwiched between top rotor cover plate 418 and bottom cover plate 420. As previously described, top rotor core 414 and bottom rotor core 416 are inserted into the rotor cage 412 (not shown). FIG. 4G further shows that each of the top cover plate slots 482 align with a corresponding rotor ring segment gap 458. Similarly, each of the bottom cover plate slots 490 align with a corresponding rotor ring segment gap 458. For example, body portion 456 of a rotor ring segment 452 along with its corresponding radial arm portion and corresponding top cover plate segment 484 form one of the rotor rings 208 of the motor described with reference to FIG. 34-1A. Similarly, body portion 456 of a rotor ring segment 452 along with its corresponding radial arm portion and corresponding bottom cover plate segment 492 form one of the other rotor rings 208 of the motor described with reference to FIG. 3-12A. As previously described, the top rotor cover plate 418 and bottom rotor cover plate 420 define two air gaps described with reference to FIG. 4A.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

I claim:

1. A motor, including:
   a stator with a stator coil to generate a periodic unidirectional magnetic field based upon a unidirectional field current flowing through the stator coil;
   a rotor; and
   an air gap between the stator and the rotor;
   wherein the rotor has at least one rotor ring, a portion of the rotor ring disposed in the air gap, a periodic electric current induced through the rotor ring due to the unidirectional magnetic field generated based upon the unidirectional field current flowing through the stator coil, the periodic electric current flowing through the portion of the rotor ring disposed in the air gap flows in a first direction to rotate the rotor relative to the stator of the motor.

2. The motor of claim 1, wherein the induced electric current is flowing in a direction opposite to the first direction in another portion of the rotor ring and the another portion of the rotor ring is substantially not subjected to the magnetic field.

3. The motor of claim 1, wherein the induced electric current is flowing in a direction opposite to the first direction in another portion of the rotor ring and the another portion of the rotor ring is disposed in a region of the rotor with a high reluctance so as to minimize torque generated due to the induced electric current flowing through the another portion of the rotor ring and maintain the rotation of the rotor relative to the stator in the same direction.

4. The motor of claim 1, wherein the stator coil is wound on a bobbin.

5. The motor of claim 1, wherein the rotor includes at least two rotor rings, wherein portions of each of the at least two rotor rings disposed in the air gap, and the periodic electric current induced through the two rotor rings due to the magnetic field flows through the portion of the rotor rings disposed in the air gap in a first direction to rotate the rotor relative to the stator.

6. The motor of claim 1, wherein the unidirectional field current flowing through the stator coil rises from an initial value to a threshold value over a period of time, wherein upon reaching the threshold value, resets to the initial value, the unidirectional field current indicative of a saw tooth waveform.

7. The motor of claim 1, wherein the unidirectional field current flowing through the stator coil periodically rises from an initial value to a threshold value over a period of time and generates the periodic unidirectional magnetic field.

8. The motor of claim 1, wherein the motor includes at least two air gaps and the rotor includes at least two rotor rings, wherein portions of each of the at least two rotor rings disposed in one of the air gaps, and the periodic electric current induced through the rotor ring due to the magnetic field flows through the portion of the rotor ring disposed in the air gap in a first direction to rotate the rotor relative to the stator.

9. The motor of claim 8, wherein the induced electric current is flowing in a direction opposite to the first direction in another portion of the rotor ring and the another portion of the rotor ring is substantially not subjected to the magnetic field.

\* \* \* \* \*